United States Patent
Takada et al.

(10) Patent No.: US 7,485,357 B2
(45) Date of Patent: Feb. 3, 2009

(54) OPTICAL RECORDING MEDIUM

(75) Inventors: Mikiko Takada, Yokohama (JP); Kazunori Ito, Yokohama (JP); Hiroshi Deguchi, Yokohama (JP); Masaki Kato, Sagamihara (JP); Hiroko Ohkura, Yokohama (JP); Hiroyoshi Sekiguchi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 49 days.

(21) Appl. No.: 11/441,284

(22) Filed: May 25, 2006

(65) Prior Publication Data

US 2006/0246270 A1 Nov. 2, 2006

Related U.S. Application Data

(63) Continuation of application No. PCT/JP2004/017429, filed on Nov. 24, 2004.

(30) Foreign Application Priority Data

Nov. 26, 2003 (JP) .............................. 2003-395680

(51) Int. Cl.
  *B32B 3/02* (2006.01)
(52) U.S. Cl. .................. 428/64.4; 428/64.5; 430/270.13
(58) Field of Classification Search ................ 428/64.5, 428/64.4; 430/270.13
  See application file for complete search history.

(56) References Cited

U.S. PATENT DOCUMENTS

| | | | |
|---|---|---|---|
| 4,818,666 | A | 4/1989 | Gravesteijn et al. |
| 6,770,346 | B2 * | 8/2004 | Harigaya et al. ............ 428/64.1 |
| 6,790,592 | B2 * | 9/2004 | Harigaya et al. ....... 430/270.13 |
| 2004/0037203 | A1 | 2/2004 | Harigaya et al. |

FOREIGN PATENT DOCUMENTS

| | | |
|---|---|---|
| JP | 61-168145 | 7/1986 |
| JP | 10-112028 | 4/1998 |
| JP | 2002-254816 | 9/2002 |
| JP | 2003-006859 | 1/2003 |
| JP | 2003231354 | 8/2003 |
| JP | 2003-246140 | 9/2003 |
| JP | 2003-248967 | 9/2003 |
| JP | 2003-248973 | 9/2003 |
| JP | 2003-291534 | 10/2003 |
| JP | 2004-050763 | 2/2004 |
| JP | 2004-174868 | 6/2004 |
| JP | 2004-181742 | 7/2004 |
| JP | 2004224040 | 8/2004 |
| JP | 2004224041 | 8/2004 |

OTHER PUBLICATIONS

Gravesteijn, D.J., et al., Phase-change optical data storage in GaSb, Applied Optics vol. 26, No. 22115, Nov. 15, 1987, pp. 4772-4776.

* cited by examiner

*Primary Examiner*—Elizabeth Mulvaney
(74) *Attorney, Agent, or Firm*—Cooper & Dunham LLP

(57) ABSTRACT

An optical recording medium including: a substrate having translucency; a first protective layer thereon; a recording layer composed of a phase-change material; a second protective layer; and a reflective layer, wherein laser beam irradiation causes phase-change of the recording layer between a crystalline phase and an amorphous phase thereby at least one of to rewrite and to record information, wherein the phase-change material comprises Ga, Sb and Sn, Ga content, Sb content, and Sn content satisfy the following formula, and the total content of Ga, Sb and Sn is at least 80 atomic % of the entire phase-change material:

$Ga_\alpha Sb_\beta Sn_\gamma$ (where, $\alpha+\beta+\gamma=100$ atomic %), where $20 \leq -2.75\alpha + 0.708\beta + 1.18\gamma - 7.56 \leq 43$, and $\alpha/(\alpha+\beta) \leq 0.12$.

16 Claims, 3 Drawing Sheets

OPTICAL RECORDING MEDIUM

CROSS-REFERENCE TO RELATED APPLICATIONS

This is a continuation of Application PCT/JP2004/017429, filed on Nov. 24, 2004.

BACKGROUND OF THE INVENTION

1. Field of the Invention

The invention relates to a rewritable optical recording medium suitable for high-speed recording corresponding to 6× speed to 12× speed of DVD.

2. Description of the Related Art

As one of optical recording media capable of rewriting information by means of semiconductor laser beam irradiation, a so-called phase-change optical recording medium is known that utilizes phase transition between crystalline-amorphous states or between crystalline-crystalline states. This phase-change optical recording medium enables repeated recording of information by a single beam, and also has a feature such that an optical system of drive is simpler. The phase-change optical recording medium is applied to optical recording media to store data on computers, or audio and visual data and is widely utilized worldwide. CD-R, CD-RW, etc. are widely utilized, and at the same time high-speed recording is already possible. Likewise, with respect to the phase-change optical recording medium, the increase of the capacity and density of medium, thus high-speed recording is essential from the perspective of high-density image recording.

Such phase-change optical recording medium, in general, comprises a substrate and recording layer, wherein heat-resistant and translucent protective layers are disposed on the both surfaces of the recording layer. Further, a reflective layer of e.g. metal or alloy is disposed on the protective layer in the side opposite to the incident direction of light beam. Information can be recorded and erased only by changing the power of a laser beam. In general, recording is conducted as follows. Crystalline state is set as unrecorded or erased state, and recording marks are formed by heating a recording layer to the temperature higher than melting point, and then very rapidly cooling, making the recording layer amorphous state.

The recording principle of phase-change optical recording medium is as follows. The crystalline state/amorphous state of the recording layer is switched using a focused laser beam pulsed at three output levels. During the switching, highest output level is used for melting of the recording layer, medium output level is used for heating the recording layer to the temperature higher than crystallization temperature, immediately below melting point, and the lowest output level is used for controlling of heating or cooing of the recording layer. The material in the recording layer is melted by the laser pulse of the highest output level, followed by very rapid cooling, and becomes an amorphous or microcrystalline state, resulting in the reduction of reflectance of the recording layer, to form a recording mark. In the case of laser pulse with medium output, the material in the recording layer becomes a crystalline state, by which information can be erased. In this way, by using the write laser pulse with different output levels, crystalline region and amorphous region can be made alternately in the recording layer, and thus information is memorized.

In order to achieve high-speed recording, it is required to use a phase-change material of fast crystallization speed in a recording layer. As such a phase-change material, attention has been paid to Ge—Te, Ge—Te—Se, In—Sb, Ga—Sb, Ge—Sb—Te, Ag—In—Sb—Te, etc. since those have fast crystallization speed and a high erasing ratio at the time of high-speed recording.

Among these, GaSb alloy has a high crystallization temperature of 350° C. and gives a mark excellent in stability (storage reliability) (see, "Phase-Change optical data storage in GaSb", Applied Optics, Vol. 26, No. 22115, November, 1987). Such GaSb alloy is one of phase-change materials to which the present inventors also have paid attention as the material of recording layer for high-speed recording so far.

Previous investigations by the present inventors, however, revealed that it is difficult to achieve high-speed recording corresponding to 6× speed to 12× speed of DVD using the GaSb binary alloy. Specifically, the limit velocity for crystallization (refer to explanation described later) of GaSb binary alloy is not sufficient for high-speed recording corresponding to 6× speed to 12× speed of DVD. Further, it was revealed that high crystallization temperature of GaSb makes initialization difficult, and even if initialization is performed by irradiating a recording layer with a laser beam having high power for initialization, the reflectance after initialization varies, resulting in insufficient recording properties. Further, it was revealed that even GaSb of eutectic composition has a relatively high melting point of 630° C., thus, making it difficult to form a mark and inviting insufficient sensitivity, and besides, it was revealed that defects are caused such as a low disc reflectance.

Further investigations by the present inventors led to the findings that Sn makes the crystallization speed of GaSb faster and effectively brings about lowering of melting point (thus, improvement of sensitivity), improvement of reflectance, and reduction in noise after initialization. Namely, it was found that GaSbSn ternary alloy enables high-speed/high-sensitivity recording corresponding to 6× speed to 12× speed of DVD.

While it was revealed that Sn makes the transition linear velocity of GaSb binary alloy which serves as the base of Sn faster and is an optimum additive element for high-speed recording, it was found that the addition of Sn causes a new problem that disc reflectance is reduced after 200 hours at 80° C., 85% RH (hereinafter, referring to as an "environmental test").

In addition to the technique mentioned above, as a known technique before this application, U.S. Pat. No. 4,818,666 discloses the use of recording material containing an alloy of GaSb or InSb having a composition ratio near 50:50 to which a metal or chalcogenide element M is added, but the composition ranges of Ga and additive element M are different from those in the present invention.

Japanese Patent Application Laid-Open No. 61-168145 discloses a phase-change optical recording medium which uses as a recording material an alloy containing GaSb as a main constituent and which records information utilizing phase-change between crystalline-crystalline states. This Literature includes an example of GaSbSn, intended for increase of contrast, but did not mention the composition ratio of Sn. With respect to Ga ratio, this Literature includes a description that in the case where Ga is less than 20%, convex portion is formed at the portion irradiated with laser beam possibly attributed to the generation of air bubble, resulting in unstable variation level of reflectance, which causes problem in practical use.

Here, the limit velocity for crystallization will be described.

Limit velocity for crystallization is a physical value representing property of the material of recording layer, which the present inventors created based on experiences. A rotating optical disc is irradiated with DC light with a given power, and the dependence of reflectance of optical disc on linear velocity of irradiation light beam, i.e., rotating speed of the optical disc (note that linear velocity dependence in a recording/reproducing system) is evaluated. The limit velocity for crystallization means the linear velocity at the time when drastic reduction of the reflectance as shown in FIG. 3 starts. In this evaluation method, "DC light with a given power" is regarded as the laser pulse with medium output (erase pulse) in the description of recording principle mentioned above, evaluating to which linear velocity crystallization (erasing) is possible when the linear velocity of irradiation light beam in the recording/reproducing system is increased. Taken up FIG. 3 as an example, it shows that when the optical disc is irradiated with the DC light at a linear velocity exceeding the limit velocity for crystallization (heavy line in the figure) of the material of recording layer, the recording layer is not satisfactorily crystallized.

SUMMARY OF THE INVENTION

An object of the invention is to provide a rewritable optical recording medium which is suitable for high-speed recording corresponding to 6× speed to 12× speed recording of DVD and has a small reduction of reflectance after the test under high temperature and high humidity.

As a result of dedicated investigations conducted by the present inventors to settle problems of GaSbSn ternary alloy, i.e., reduction of reflectance after the environmental test, the present inventors have found that by defining the composition ratio of GaSbSn alloy, especially, the composition ratio of Sn to be added, the above-mentioned problems are dramatically improved, and found that a phase-change optical recording medium can be provided that satisfies satisfactory recording properties and storage reliability in a high-speed recording corresponding to 6× speed to 12× speed of DVD, leading to the accomplishment of the invention.

Specifically, the above-mentioned problems are solved by the following aspect s of the invention.

1) An optical recording medium including: a substrate having translucency; a first protective layer thereon; a recording layer composed of a phase-change material; a second protective layer; and a reflective layer, wherein laser beam irradiation causes phase-change of the recording layer between a crystalline phase and an amorphous phase thereby at least one of to rewrite and to record information, wherein the phase-change material comprises Ga, Sb and Sn, Ga content, Sb content, and Sn content satisfy the following formula, and the total content of Ga, Sb and Sn is at least 80 atomic % of the entire phase-change material:

$Ga_\alpha Sb_\beta Sn_\gamma$ (where, $\alpha+\beta+\gamma=100$ atomic %), where $20 \leq -2.75\alpha+0.708\beta+1.18\gamma-7.56 \leq 43$, and $\alpha/(\alpha+\beta) \leq 0.12$.

2) An optical recording medium including: a substrate having translucency; a first protective layer thereon; a recording layer composed of a phase-change material; a second protective layer; and a reflective layer, wherein laser beam irradiation causes phase-change of the recording layer between a crystalline phase and an amorphous phase thereby at least one of to rewrite and to record information, wherein the phase-change material comprises Ga, Sb and Sn, Ga content, Sb content, and Sn content satisfy the following formula, and the total content of Ga, Sb and Sn is at least 80 atomic % of the entire phase-change material:

$Ga_\alpha Sb_\beta Sn_\gamma$ (where, $\alpha+\beta+\gamma=100$ atomic %), where $20 \leq -2.75\alpha+0.708\beta+1.18\gamma-7.56 \leq 43$, and $\gamma \leq 5$, or $\gamma \geq 22$.

DESCRIPTION OF THE PREFERRED EMBODIMENTS

Figure 1:
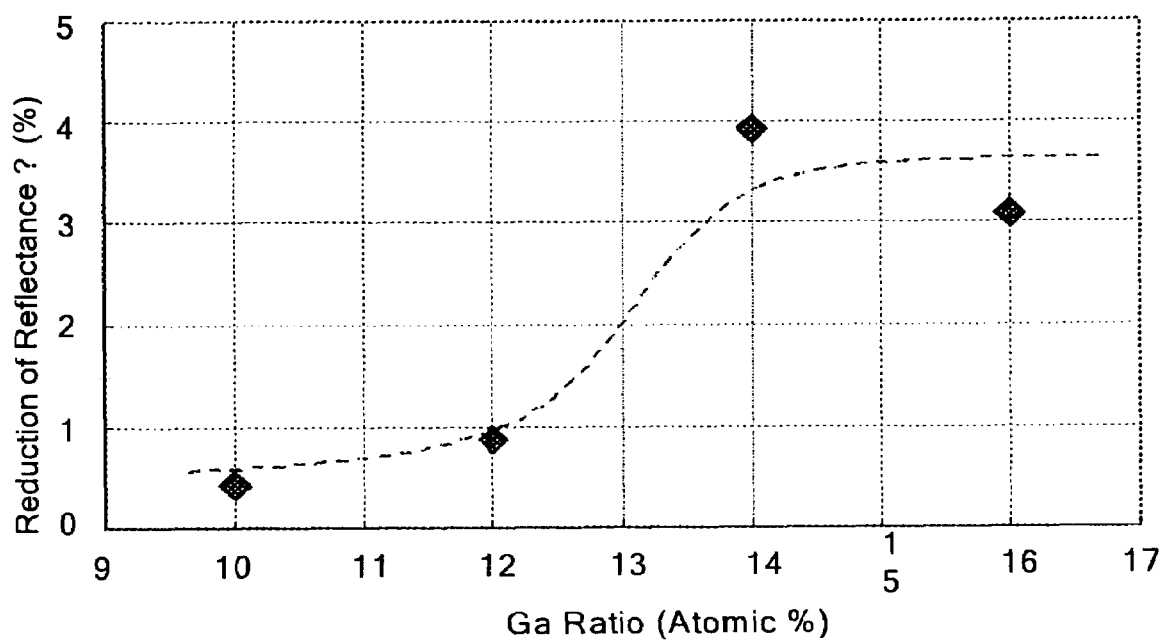
FIG. 1 is a graph showing the relation between Ga composition ratio (atomic %) in GaSb binary alloy and reduction of reflectance |Δ| (%) after the environmental test.

The present invention mentioned above will be described in detail below.

In a first aspect of the invention, alloys satisfying the following composition formula are used as the material of recording layer:

$Ga_\alpha Sb_\beta Sn_\gamma$ (where, $\alpha+\beta+\gamma=100$ atomic %), where $20 \leq -2.75\alpha+0.708\beta+1.18\gamma-7.56 \leq 43$, and $\alpha/(\alpha+\beta) \leq 0.12$ Alloys containing GaSbSn as a main constituent are preferable as the material of recording layer constituting a rewritable optical recording medium for high-speed recording corresponding to 6× speed to 12× speed of DVD. Sb, a main element constituting the alloy, is an excellent phase-change material that can achieve high-speed recording. By changing Sb ratio, crystallization speed can be adjusted, for example, by increasing the ratio, crystallization speed can be made faster.

Small amount of Ga to be added also can make the crystallization speed faster. In addition, Ga is effective for the improvement of the stability of a mark since it has an effect to raise crystallization temperature. However, too much amount of Ga to be added leads to excessively high crystallization temperature, making it difficult to obtain uniform crystalline state with high reflectance at the time of initialization in the process of production in which an amorphous phase is changed to a crystalline phase beforehand.

Sn not only has an effect of making the crystallization speed faster as Ga does but also makes the melting point of phase-change material lower. Therefore, Sn is a very effective element for improving the sensitivity of recording medium. Further, Sn is effective for improving reflectance and reducing noise after initialization, and also has an effect on the improvement of overwrite properties. However, too much amount of Sn to be added leads to deterioration of reproduction beam and initial jitter, and causes deterioration of storage reliability. Thus, the amount of Sn to be added is preferably less than 50 atomic %.

The GaSbSn alloy is used in which, to the GaSb alloy having fast crystallization speed and excellent storage reliability, is added Sn that makes the crystallization speed faster and brings about lowering of melting point (thus, improvement of sensitivity), improvement of reflectance, and reduction effect in noise after initialization. As mentioned above, the use of such GaSbSn alloy can provide a phase-change optical recording medium which achieves high-speed/high-sensitivity recording 6× speed to 12× speed of DVD, is easily initialized, and has a uniform reflectance distribution after initialization.

However, there still remained the problem that GaSbSn alloy has reduced reflectance after 200 hours at 80° C., 85% RH (hereinafter, referring to as an environmental test). Specifically, in order to evaluate the storage reliability of recording medium, a recording medium is left in the thermostatic chamber at 80° C. and 85% RH for 200 hours and the reflectance at an unrecorded portion is compared before and after the test. The reflectance after the test is reduced by as much as about 7% compared with that before the test. The problem of reduction in reflectance meant the deterioration of storage reliability, especially shelf property.

Under such situation, investigations by the present inventors, newly revealed that the GaSb binary alloy, to which Sn is not added, has reduced reflectance after the environmental test, and besides, the degree thereof is different depending on the composition ratio of Ga and Sb.

FIG. 1 shows the relation between Ga composition ratio (atomic %) in the GaSb binary alloy and reduction of reflectance |Δ| (%) after the environmental test. From FIG. 1, it is found that to the vicinity of 14 atomic % of Ga ratio, as the Ga ratio increases, the reduction of reflectance gradually becomes large, and when the Ga ratio is 14 atomic % or more, the reduction of reflectance becomes almost constant (about 3%).

The present inventors focused attention only on the amount of Sn to be added with the composition ratio of GaSb in the GaSbSn kept constant and has further found that in the case of Sn there also exists an optimum range in which the reduction of reflectance becomes small.

Figure 2:
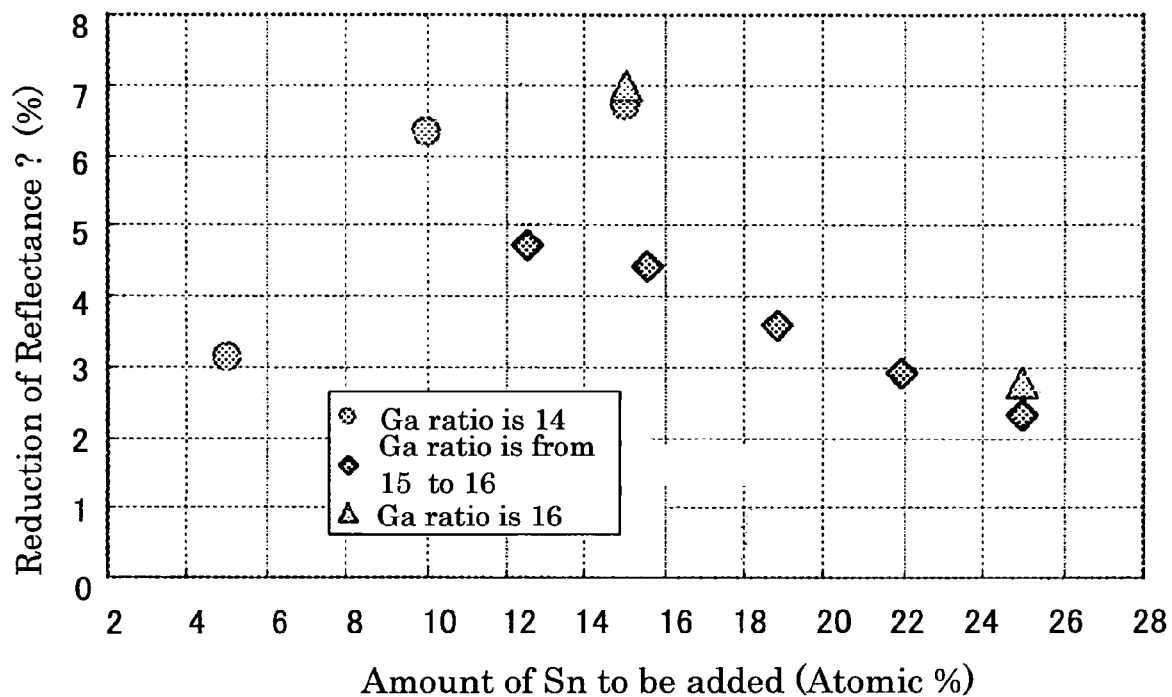
FIG. 2 is a graph showing the relation between Sn composition ratio (atomic %) in GaSbSn ternary alloy and reduction of reflectance |Δ| (%) before and after the environmental test.
Figure 3:
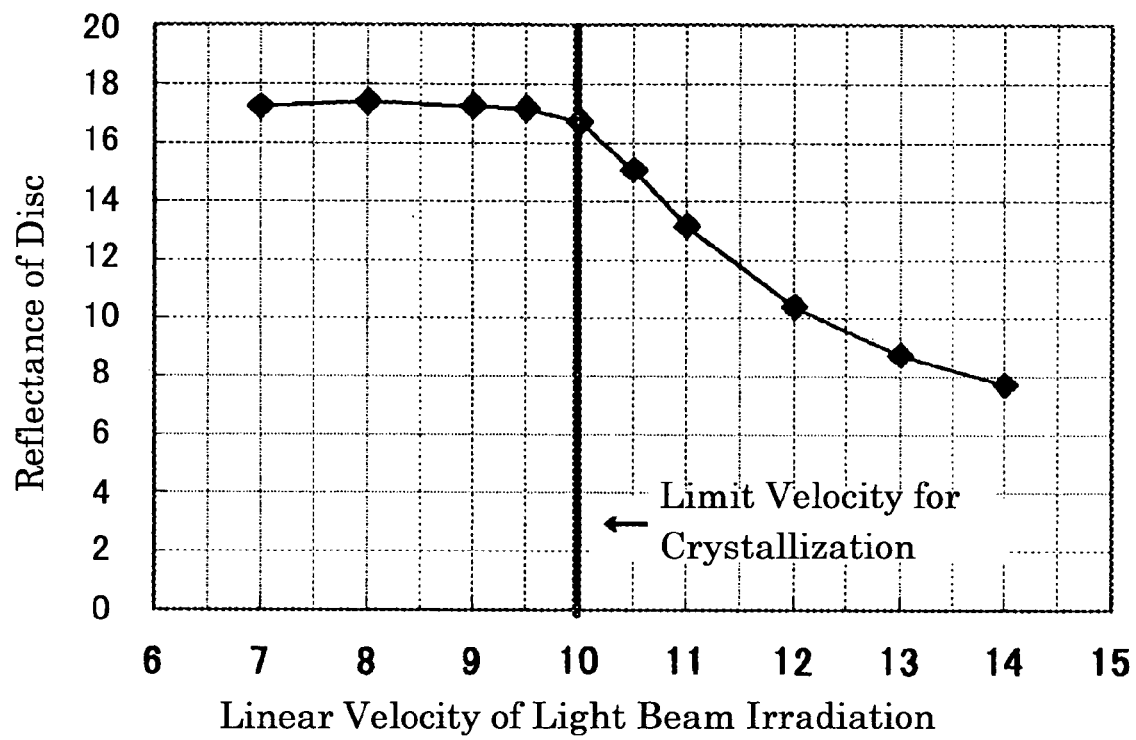
FIG. 3 is a graph for explaining limit velocity for crystallization.

FIG. 2 shows the relation between Sn composition ratio (atomic %) in GaSbSn ternary alloy and the reduction of reflectance |Δ| (%) before and after the environmental test.

As mentioned above, the GaSbSn ternary alloys, which were used as sample in this test, can be regarded as a phase-change material having a GaSb binary alloy as a parent phase from the viewpoint of its composition ratio. As was described with reference to FIG. 1, the GaSb binary alloy, serving as a base of the phase-change material, have a feature that |Δ| varies depending on the Ga composition ratio. Thus, samples were examined satisfying $0.14 \leq Ga/(Ga+Sb)$ where reduction of reflectance is constant.

From FIG. 2, it was found that any sample has a maximum |Δ| at around 10 atomic % to 15 atomic % of Sn composition ratio. As shown in FIG. 2, when the Sn composition ratio is 5 atomic % or less, or 22 atomic % or more, the reduction of reflectance is about 3%, but as shown in FIG. 1, in the case of 14 (atomic %)$\leq$Ga, even if Sn is not added, reflectance is reduced by about 3%. Thus, it can be considered that the reduction of reflectance caused by Sn does not appear when the Sn composition ratio is 5 atomic % or less, or 22 atomic % or more. Preferably, the amount of Sn is 1 atomic % or more, and when the amount is less than 1 atomic %, the effect of Sn becomes unclear. As mentioned above, the amount of Sn is preferably 50% or less.

Therefore, considering the above-mentioned findings, first of all, for the GaSbSn ternary alloy, when the composition ratio of Ga and Sb is set to $\alpha/(\alpha+\beta) \leq 0.12$, an optical recording medium can be provided that has a reduction of reflectance of 5% or less after the environmental test independently of the amount of Sn to be added. Namely, the amount of reduction of reflectance attributable to Sn, determined by comparing FIGS. 1 and 2, is about 4% at most. On the other hand, when Ga and Sb satisfies $0.12 \geq Ga/(Ga+Sb)$, the amount of the reduction of reflectance based on Ga/(Ga+Sb) ratio is 1% at most as seen in FIG. 1. Thus, the total reduction of reflectance is as little as 5% or less. Preferably, α is 2 atomic % or more. Small amount of Ga to be added can make the crystallization speed faster, and Ga has an effect to raise crystallization temperature. Thus, Ga is an element effective for the improvement of stability of a mark. However, when α is less than 2 atomic %, the crystallization speed is lowered, satisfactory overwrite cannot be obtained at a recording linear velocity of 43 m/s which corresponds to 12× speed of DVD, and besides, storage reliability deteriorates.

Further, the relation between the limit velocity for crystallization V [m/s] and the GaSbSn composition ratio was examined, and it was found that there is a relation expressed by the following formula and found that when V satisfies $20 \leq V \leq 43$, GaSbSn alloy is optimum for high-speed recording corresponding to 6× speed to 12× speed of DVD.

$$Ga_\alpha Sb_\beta Sn_\gamma \text{(where, } \alpha+\beta+\gamma=100 \text{ atomic \%),}$$

$$\text{where } V=-2.75\alpha+0.708\beta+1.18\gamma-7.56$$

Namely, multivariable analysis (linear) of transition linear velocity was performed using the composition ratio (α,β, γ) of each element of GaSbSn ternary alloy as a parameter to calculate the function using program by regression.

Specifically, supposing that transition linear velocity value V of GaSbSn ternary alloy is expressed by the following formula:

$$V(Xi)=X_1 \times Ga+X_2 \times Sb+X_3 \times Sn+const,$$

by using a program (least-square method) in Excel, a line best fitting to actual measurement values was calculated, and each coefficient Xi (−2.75=α, 0.708=β, 1.18=γ,−7.56, etc.) was determined by regression.

Thus, by setting the composition of GaSbSn alloy to the range of composition formula defined in the first aspect of the invention, a phase-change optical recording medium can be provided that is suitable for high-speed recording corresponding to 6× speed to 12× speed recording of DVD, and has a reduction of reflectance of 5% or less after the environmental test independently of the amount Sn to be added.

In a second aspect of the invention, alloys satisfying the following composition formula are used as the material of recording layer:

$$Ga_\alpha Sb_\beta Sn_\gamma \text{(where, } \alpha+\beta+\gamma=100 \text{ atomic \%),}$$

$$\text{where } 20 \leq -2.75\alpha+0.708\beta+1.18\gamma-7.56 \leq 43,$$

$$\text{and } \gamma \leq 5, \text{ or } \gamma \geq 22.$$

In the foregoing FIG. 1, it was revealed that in the case of $Ga/(Ga+Sb) \geq 0.14$, the reduction of reflectance before and after the environmental test is about 3% to 4%. Further, in the foregoing FIG. 2, it was revealed that in the case of $Ga/(Ga+Sb) \geq 0.14$, the range, in which the reduction of reflectance caused by Sn is abated, is 5% or less, or 22% or more. Thus, considering these findings, by setting the composition of GaSbSn alloy to the range defined in the second aspect of the invention, a phase-change optical recording medium can be provided that is suitable for high-speed recording corresponding to 6× speed to 12× speed recording of DVD, and has a reduction of reflectance before and after an environmental test of 4% or less at most independently of Ga ratio in GaSb.

In a third aspect of the invention, alloys satisfying the following composition formula are used as the material of recording layer:

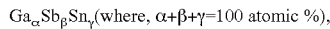

where $20 \leq -2.75\alpha + 0.708\beta + 1.18\gamma - 7.56 \leq 43$, and $0.12 < \alpha/(\alpha+\beta) < 0.14$, and $\gamma < 5$, or $\gamma \geq 22$.

In the foregoing FIG. 1, it was revealed that in the case of $0.12 < \text{Ga}/(\text{Ga}+\text{Sb}) < 0.14$, the reduction of reflectance before and after the environmental test is about 1% to 3%. Further, in the foregoing FIG. 2, it was revealed that the range, in which the reduction of reflectance caused by Sn is abated, is 5% or less or 22% or more. Thus, considering these findings, by setting the composition of GaSbSn alloy to the range defined in the third aspect of the invention, a phase-change optical recoding medium can be provided that is suitable for high-speed recording corresponding to 6× speed to 12× speed recording of DVD, and has a reduction of reflectance after the environmental test of 1% or more to less than 3% independently of Ga ratio in GaSb.

In a fourth aspect of the invention, alloys satisfying the following composition formula are used as the material of recording layer:

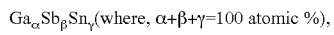

where $20 \leq -2.75\alpha + 0.708\beta + 1.18\gamma - 7.56 \leq 43$, and $\alpha/(\alpha+\beta) \leq 0.12$, and $\gamma \leq 5$, or $\gamma \geq 22$.

In the foregoing FIG. 1, it was revealed that in the case of $\text{Ga}/(\text{Ga}+\text{Sb}) \leq 0.12$, the reduction of reflectance before and after the environmental test is about 1%. Further, in the foregoing FIG. 2, it was revealed that the range, in which the reduction of reflectance caused by Sn is abated, is 5% or less, or 22% or more. Thus, considering these findings, if GaSbSn alloy is defined to the range of composition formula in the fourth aspect of the invention, a phase-change optical recording medium can be provided that is suitable for high-speed recording corresponding to 6× speed to 12× speed recording of DVD, and has a reduction of reflectance after the environmental test of less than 1% independently of Ga ratio in GaSb.

In a fifth and sixth aspect of the invention, as a phase-change material, alloys containing GaSbSn as a main constituent and 1 atomic % to 20 atomic % of Ge as an additive element, or alloys containing GaSbSn as a main constituent and 1 atomic % to 10 atomic % of at least one element selected from In, Al, Zn, Mg, Tl, Pb, Bi, Cd, Hg, Se, C, N, Au, Ag, Cu, Mn, and Dy as an additive element is used. Here, the "main constituent" means a constituent taking over 50 atomic % or more of the entire phase-change material. of the recording layer. Preferably, the total content of Ga, Sb and Sn is 80 atomic % or more of the entire phase-change material.

As the material of recording layer constituting a rewritable optical recording medium which is suitable for high-speed recording corresponding to 6× speed to 12× speed of DVD and has a small reduction of reflectance after the environmental test, as defined in the first to fourth aspects of the invention, alloys containing as a main constituent GaSbSn, of which Ga ratio and/or composition ratio of Sn is optimized, are preferable. This is because the combination of GaSb alloy, which has an extremely high crystallization speed (see, "Phase-Change optical data storage in GaSb", Applied Optics, Vol. 26, No. 22115, November, 1987) and has a high crystallization temperature (i.e., excellent storage reliability); and Sn, which makes the crystallization speed of GaSb faster and effectively brings about lowering of melting point, enables an optical recording medium with a desired high-speed/high-sensitivity recording, and with a satisfactory storage reliability. This is also because by adjusting the Ga ratio, and/or Sn ratio, the reduction of reflectance after the environmental test can be controlled.

However, the problem of the reduction of reflectance is a property associated with a shelf property after the environmental test. On the other hand, the archival property is not satisfactory possibly because Sn is expected to facilitate crystallization of a phase-change material (Here, "shelf property" specifically means the stability of an unrecorded portion, and "archival property" means the stability of a mark.).

As mentioned above, Ga which constitutes GaSbSn can make the crystallization speed faster by adding a small amount and has an effect of making the crystallization temperature of a phase-change material higher, thus effectively improving the stability of a mark. Too much amount of Ga to be added, however, leads to excessively high crystallization temperature, which makes it difficult to obtain uniform crystalline state with high reflectance at the time of "initialization" in the process of production in which an amorphous phase is changed to a crystalline phase beforehand.

Thus, considering such archival property and such problem of initialization, Ge is added as the fourth element in order to compensate Ga. Ge does not have an effect of making the crystallization speed faster; however, the small amount of Ge to be added can improve the storage reliability dramatically without raising the crystallization temperature so much as Ga does. Thus, Ge is an important additive element for the phase-change material containing GaSbSn as a main constituent. The addition of 1 atomic % or more of Ge has an effect of improving amorphous stability of recording layer of which crystallization speed is fast. As the amount to be added increases, the effect becomes higher, but excessive addition has harmful effects such as jitter increase due to overwrite. Thus, preferably, the upper limit of Ge is also 20 atomic %.

Next, other additive elements which are added to GaSbSn or GaSbSnGe alloys will be explained.

"In" has a similar effect as Ga does and has a merit not to make the crystallization temperature so high as Ga does. Thus, considering the problem of initialization, it is effective to use In as an element to compensate Ga. Excessive addition of In, however, leads to reduction of repeated recording property, and besides causes reduction of reflectance. Thus, the amount of In to be added is preferably 10 atomic % or less. In addition to "In" Al, Dy, Mg, Tl, PB, Bi, Cd and Hg also have an effect of making the limit velocity for crystallization faster.

Mn and Zn has an effect of making the limit velocity for crystallization slower; however, those are preferable since reduction of reflectance is abated and improper initialization is improved. Especially, Mn was found to be an additive element also effective for storage reliability. The optimum amount of Mn to be added is 1 atomic % to 10 atomic %. If the amount to be added is less than 1 atomic %, the effect of Mn cannot be obtained. If the amount to be added is more than 10 atomic %, the reflectance of unrecorded state (crystalline state) becomes too low.

In addition to Ge and Mn, the addition of Al, Se, C, and/or N also can improve the storage reliability. Further, Al and Se contribute to high-speed crystallization. Furthermore, Se contributes to the improvement of recording sensitivity.

It is desirable to incorporate Au, Ag, and/or Cu together with the above-mentioned additive element. Au, Ag, and Cu provide excellent storage reliability and are an effective element to improve improper initialization of high-speed recording material. At the same time, Au, Ag, and Cu have property to prevent high-speed recording by making the crystallization speed of recording material lowered. Therefore, it is preferable to set the upper limit of the amount to be added to about 10 atomic %. By combining Au, Ag, and/or Cu with the above-mentioned additive element properly, a phase-change material can be designed that makes high-speed recording possible, makes initialization easy, and has excellent storage reliability.

As described above, by adjusting the composition ratio of phase-change material of GaSbSn, or GaSbSnGe system, a recording material can be designed of which crystallization speed is fast and which has excellent storage reliability, specifically a recording material, making high-speed recording possible corresponding to 6× speed to 12× speed of DVD, can be designed.

Specifically, for example, attention is paid on the high-speed crystallization characteristic of GaSbSn alloy. Deterioration of archival property, which is a defect of GaSbSn alloy, and difficulty of initialization caused by high crystallization temperature are avoided by adding an additive element such as In and Ge. Alternatively, attention is paid on the high storage reliability of GaSbSnGe alloy and a high-speed crystallization characteristic is compensated by Bi, etc. Thus, a medium which satisfies high-speed crystallization, and properties such as storage reliability and recording sensitivity can be realized.

In a seventh aspect of the invention, a mixture of ZnS and $SiO_2$ is used for a first protective layer and/or second protective layer. This material is appropriate for the first protective layer due to its excellent thermal resistance, low thermal conductivity, and chemical stability. This material is also suitable for the second protective layer because the resulting film has a small residual stress, deterioration of properties such as recording sensitivity and erasing ratio is not likely to occur after repeated recording and/or erasing.

In an eighth and ninth aspects of the invention, pure Ag or an alloy containing Ag as a main constituent is used as the material of reflective layer. As the material of reflective layer, typically, "a metal having a high thermal conductivity/high reflectance" is preferable in terms of "thermal conductivity" which adjusts the cooling speed of the heat developed at the time of recording as well as an "optical" point of view of improving the contrast of a reproducing signal by using an interference effect. An elementary substance of Au, Ag, Cu, or Al, or alloys containing these metals as a main constituent is used conventionally. In contrast, in the eighth and ninth aspects of the invention, pure Ag or an alloy containing Ag as a main constituent is used since Ag has an extremely high thermal conductivity of 427 W/m·K and is capable of realizing a quenching structure suitable for the formation of an amorphous mark better than other metals. In terms of high thermal conductivity, pure silver is the most favorable, and taking into consideration a corrosion resistance, Cu may be added for example. In this case, in order not to sacrifice the properties of Ag, the amount of Cu, etc. to be added is preferably about 0.1 atomic % to 10 atomic %, and more preferably 0.5 atomic % to 3 atomic %. An excessive addition adversely affects the corrosion resistance of Ag.

Moreover, in the eighth and ninth aspects of the invention, a reflective layer formed of pure Ag or an alloy containing Ag as a main constituent is used. Thus, the use of a material containing sulfur such as a mixture of ZnS and $SiO_2$ in the second protective layer causes a defect of optical recording medium since sulfur reacts with Ag (sulfuration reaction of Ag), which leads to the corrosion of reflective layer. Therefore, it is necessary further to use a third protective layer (sulfuration preventing layer) which does not contain sulfur. A third protective layer which prevents such sulfuration reaction of Ag is selected, for example, from the following viewpoints:

(1) having a barrier capability to prevent the sulfuration reaction of Ag;
(2) being optically transparent to the laser beam;
(3) having a low thermal conductivity for the formation of an amorphous mark;
(4) having good adhesion with the protective layer and the metal reflective layer; and
(5) being easily formed, and a material comprising Si or SiC as a main constituent which satisfies the above-mentioned requirements is preferable.

In a tenth aspect of the invention, the first protective layer has a film thickness of 40 nm to 200 nm, the recording layer has a film thickness of 6 nm to 20 nm, the second protective layer has a film thickness of 4 nm to 20 nm, the third protective layer has a film thickness of 2 nm to 10 nm, and the reflective layer has a film thickness of 100 nm to 300 nm.

The film thickness of the first protective layer is set to an optimum range thermally and optically, and preferably is 40 nm to 200 nm, more preferably 40 nm to 100 nm.

Preferably, the recording layer has a film thickness of 6 nm to 20 nm. If the thickness is less than 6 nm, deterioration of recording properties due to repeated recording is remarkable. If the thickness is more than 20 nm, the movement of recording layer due to repeated recording occurs easily, resulting in the remarkable increase of jitter. In order to improve erasing properties by making the absorptance difference between crystalline and amorphous states as small as possible, thinner recording layer is preferable and, more preferably, the recording layer has a film thickness of 10 nm to 20 nm.

The film thickness of the second protective layer is associated with and directly influences the cooling of recording layer. Thus, the film thickness is required to be 3 nm or more to obtain satisfactory erasing properties and durability for repeated recording. The film thickness thinner than this value is not preferable since a defect such as a crack occurs, resulting in the reduced durability for repeated recording, and besides, recording sensitivity is impaired. Also, the film thickness more than 20 nm is not preferable since the cooling speed of recording layer becomes slow, making it difficult to form marks and thus resulting in smaller mark area. More preferably, the second protective layer has a film thickness of 4 nm to 15 nm.

Preferably, the reflective layer has a film thickness ranging from 100 nm to 300 mn.

In an eleventh aspect of the invention, a substrate having a meandering groove with a groove pitch of 0.74±0.03 μm, a groove depth of 22 nm 40 nm, and a groove width of 0.2 μm to 0.4 μm is used as the substrate of the first to tenth aspects of the invention.

This can provide a DVD+RW medium which meets current standards of DVD+RW medium and allows for high-speed recording of 4× speed or more (specifically, corresponding to 6× speed to 12× speed=about 20 m/s to 43 m/s). The purpose of making the groove meander is, for example, to allow for access to a specific unrecorded track and to rotate a substrate at a constant linear velocity.

The reduction of reflectance after the environmental test, which is a defect of GaSbSn ternary alloy having high-speed/high-sensitivity recording properties, is overcome by defining the Ga ratio and Sn ratio, and composition range appropriate for high-speed recording corresponding to 6× speed to 12× speed of DVD has been found by investigating the relation between the composition ratio of each element of GaSbSn ternary alloy and the limit velocity for crystallization. Consequently, a phase-change optical recording medium can be provided that has satisfactory recording properties, storage reliability and initialization characteristics even in a high-speed recording corresponding to 6× speed to 12× speed of DVD, and has a small reduction of reflectance after the environmental test.

EXAMPLES

Hereinafter, the invention will be illustrated more specifically with reference to several examples and comparative examples. However, the invention is not limited to these examples and/or the used initialization device, etc. For example, the invention is also applicable to a surface recording type rewritable optical recording medium in which layers are formed in the reverse order, or to a recording medium in which two same or different optical recording media are laminated to each other via a resin protective layer instead of a substrate for laminating used in an optical recording medium of DVD system.

Figure 4:
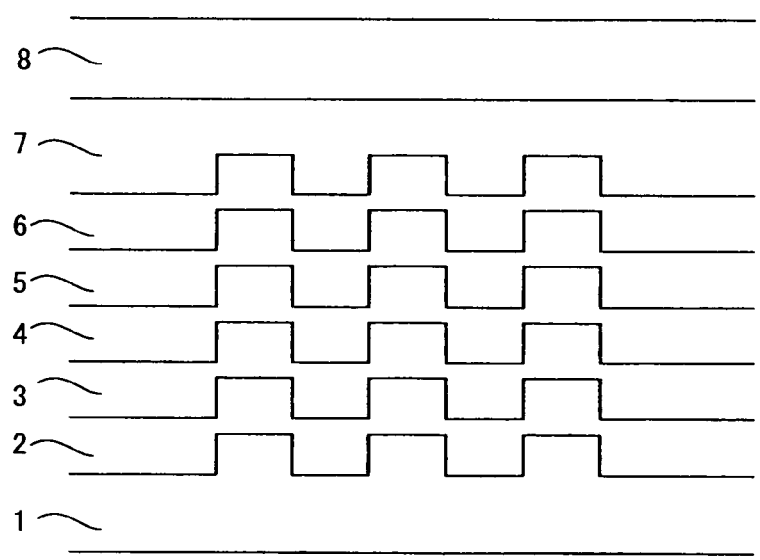
FIG. 4 is a schematic cross-sectional view of a phase-change optical disc which is an example of the rewritable optical recording medium of the invention.

FIG. 4 shows a schematic cross-sectional view of a phase-change optical disc (hereinafter, may be referred to as "optical disc"), which is an example of the rewritable optical recording medium of the invention. This optical disc comprises a transparent substrate 1 on which a guide groove to guide a laser beam is provided, a first protective layer 2, a phase-change recording layer 3 which reversibly changes its phase between crystalline and amorphous states, a second protective layer 4, a third protective layer 5, a reflective layer 6, a resin protective layer 7, and a substrate 8 for laminating. The first protective layer 2, phase-change recording layer 3, second protective layer 4, third protective layer 5, reflective layer 6, resin protective layer 7 are disposed in this order over the upper surface of the substrate 1, and finally, the substrate 8 is laminated.

Examples 1 to 6

A substrate 1 was a substrate made of polycarbonate with a diameter of 12 cm and a thickness of 0.6 mm, and having a guide groove with a tracking pitch of 0.74 μm. A first protective layer 2 was a 65 nm thick layer containing ZnS (80 mole %)-SiO$_2$ (20 mole %). A phase-change recording layer 3 was a 16 nm thick layer containing Ga$_{11}$Sb$_{83}$Sn$_6$ (Example 1), Ga$_{14}$Sb$_{58}$Sn$_{28}$ (Example 2), Ga$_{12}$Sb$_{83}$Sn$_5$ (Example 3), Ga$_{10}$Sb$_{89}$Sn$_1$ (Example 4), Ga$_{11}$Sb$_{86}$Sn$_3$ (Example 5), or Ga$_{11}$Sb$_{84}$Sn$_5$ (Example 6). A second protective layer 4 was a 14 nm thick layer containing ZnS (80 mole %)-SiO$_2$ (20 mole %). A third protective layer 5 was a 4 nm thick layer containing SiC. A reflective layer 6 was a 140 nm thick layer containing Ag. A substrate 8 for laminating was a substrate made of polycarbonate with a diameter of 12 cm and a thickness of 0.6 mm, which were the same as those of the substrate 1.

Initially, on the substrate 1, the first protective layer 2, phase-change recording layer 3, second protective layer 4, third protective layer 5, reflective layer 6 were formed in this order by a sputtering method, then the resin protective layer 7 was formed on the reflective layer 6 by a spin coating method, and lastly, the substrate 8 for laminating having similar shape was laminated to prepare an optical disc.

Next, an initialization method and evaluation method of recording properties of this optical disc will be described.

Initialization was carried out as follows. Using "PCR DISK INITIALIZER" manufactured by Hitachi Computer Peripherals Co., Ltd. as an initialization device, the above-mentioned optical disc was rotated at a constant linear velocity and was irradiated with a laser beam with a power density of 10 mW/μm$^2$ to 20 mW/μm$^2$ while moving the laser beam at a constant feed in radius direction. (Initialization was carried out using the same device in Examples and Comparative Examples which will be described below.)

Recording properties were evaluated using an optical disc evaluation apparatus (DDU-1000: manufactured by Pulstec Industrial Co., Ltd.) having a pickup of 660 nm wavelength and 0.65 NA under the conditions of a recording linear velocity of 21 m/s, 28 m/s, 35 m/s, or 43 m/s (corresponding to 6× speed, 8× speed, 10× speed, and 12× speed of DVD) and a linear density of 0.267 μm/bit. The C/N ratio was evaluated when 3T single pattern was overwritten 10 times by EFM+ modulation method.

When materializing a rewritable optical disc system, the C/N ratio is required to be at least 45 dB and if the C/N ratio is 50 dB or more, more stable system can be achieved. Thus, evaluation standard is as follows.

A: C/N ratio is 50 dB or more,
B: C/N ratio is 45 dB to less than 50 dB,
C: C/N ratio is less than 45 dB.

Storage reliability was evaluated as follow. Regarding the shelf property, i.e., the above-mentioned disc was left in the thermostatic chamber at 80° C. and 85% RH for 200 hours, and the reduction of reflectance |Δ| (%) of an unrecorded portion was evaluated. Regarding the archival property, the disc recorded according to the above-mentioned procedure was left in the thermostatic chamber at 80° C. and 85% RH for 200 hours, and then the C/N ratio was evaluated. "-" in the Table means that evaluation was not carried out.

Results are shown together in Table 1. It was confirmed that in any of Examples 1 to 6, high C/N ratio, 45 dB or more, was obtained and also confirmed that the reduction of reflectance |Δ| (%) of an unrecorded portion after the environmental test was about 5% at most. Namely, in both items of recording properties and storage reliability, satisfactory results could be obtained. In Table 1, 6×, 8×, 10×, and 12× mean 6× speed, 8× speed, 10× speed, and 12× speed, respectively.

Example 7

An optical disc having the same layer configuration as that of the optical disc of Example 3 was prepared in the same way as in Example 3, except that the material of phase-change recording layer 3 was changed to Ga$_{11}$Sb$_{59}$Sn$_{22}$Ge$_8$. Compared with Example 3, in this Example, a phase-change material was used in which the ratios of Ga and Sb were reduced, but instead, to which Ge, effective for storage reliability, and Sn, making the crystallization speed faster, were added.

This optical disc was evaluated after initialization in the same way. It was found that satisfactory recording properties was obtained as in Example 3, and further found that the archival property hardly deteriorated. Results are shown in Table 1.

Example 8

An optical disc having the same layer configuration as that of the optical disc of Example 7 was prepared in the same way as in Example 7, except that the material of phase-change recording layer 3 was changed to Ga$_{11}$Sb$_{59}$Sn$_{22}$Ge$_6$In$_2$. Compared with Example 7, in this Example, a phase-change material was used in which the ratio of Ge was reduced, but instead, to which In, making the crystallization speed faster, was added.

This optical disc was evaluated after initialization in the same way. It was found that the addition of In led to larger reduction of reflectance |Δ| (%) of an unrecorded portion than that in Example 7, but was found that satisfactory recording properties could be obtained in a high linear velocity recording of 12×.

Example 9

An optical disc having the same layer configuration as that of the optical disc of Example 7 was prepared in the same way as in Example 7, except that the material of phase-change recording layer 3 was changed to $Ga_{11}Sb_{59}Sn_{22}Ge_6Bi_2$. Compared with Example 7, in this Example, a phase-change material was used in which the ratio of Ge was reduced, but instead, to which Bi, making the crystallization speed faster, was added.

This optical disc was evaluated after initialization in the same way. It was found that similarly to Example 8, the addition of Bi led to larger reduction of reflectance |Δ| (%) of an unrecorded portion than that in Example 7, but was found that satisfactory recording properties could be obtained in a high linear velocity recording of 12×.

Example 10

An optical disc having the same layer configuration as that of the optical disc of Example 7 was prepared in the same way as in Example 7, except that the material of phase-change recording layer 3 was changed to $Ga_{11}Sb_{59}Sn_{22}Ge_6Se_2$. Compared with Example 7, in this Example, a phase-change material was used in which the ratio of Ge was reduced, but instead, to which Se, effective for improving recording sensitivity, was added.

This optical disc was evaluated after initialization in the same way. It was found that similarly to Example 8, the addition of Se led to larger reduction of reflectance |Δ| (%) of an unrecorded portion than that in Example 7, but was found that the recording sensitivity was more excellent than that in Example 7.

Example 11

An optical disc having the same layer configuration as that of the optical disc of Example 7 was prepared in the same way as in Example 7, except that the material of phase-change recording layer 3 was changed to $Ga_{11}Sb_{59}Sn_{22}Ge_6Zn_2$. Compared with Example 7, in this Example, a phase-change material was used in which the ratio of Ge was reduced, but instead, to which Zn, effective for improving reduction of reflectance, was added.

This optical disc was evaluated after initialization in the same way. It was found that the reduction of reflectance was improved more than in Example 7.

Example 12

An optical disc having the same layer configuration as that of the optical disc of Example 7 was prepared in the same way as in Example 7, except that the material of phase-change recording layer 3 was changed to $Ga_{11}Sb_{59}Sn_{22}Ge_6Mn_2$. Compared with Example 7, in this Example, a phase-change material was used in which the ratio of Ge was reduced, but instead, to which Mn, effective for improving reduction of reflectance and effective for storage reliability, was added.

This optical disc was evaluated after initialization in the same way. It was found that the reduction of reflectance was improved more than in Example 7 and that the archival property hardly deteriorated.

Example 13

An optical disc having the same layer configuration as that of the optical disc of Example 7 was prepared in the same way as in Example 7, except that the material of phase-change recording layer 3 was changed to $Ga_{11}Sb_{59}Sn_{22}Ge_6Ag_2$. Compared with Example 7, in this Example, a phase-change material was used in which the ratio of Ge was reduced, but instead, to which Ag, effective for improving improper initialization and effective for storage reliability, was added.

This optical disc was evaluated after initialization in the same way. It was found that the distribution of reflectance after the initialization was uniform and that the archival property hardly deteriorated.

Comparative Example 1

An optical disc having the same layer configuration as that of the optical disc of Example 1 was prepared in the same way as in Example 1, except that the phase-change material of Example 1 was changed to $Ga_{13}Sb_{71}Sn_{16}$. This material satisfies $20 \leq -2.75\alpha + 0.708\beta + 1.18\gamma - 7.56 \leq 43$, but $0.14 < \alpha/(\alpha+\beta)$ and $5 < \gamma < 22$ (atomic %), which is a phase-change material outside the scope of the present invention.

This optical disc was evaluated after initialization in the same way. It was found that recording properties were sufficient, but the reduction of reflectance after 200 hours left at 80° C. and 85% RH was 7% or more, and also found that the archival property deteriorated. The results are shown in Table 1.

Comparative Example 2

An optical disc having the same layer configuration as that of the optical disc of Example 1 was prepared in the same way as in Example 1, except that the phase-change material of Example 1 was changed to $Ga_8Sb_{75}Sn_{17}$. This material satisfies $\alpha/(\alpha+\beta) \leq 0.12$, but $43 < -2.75\alpha + 0.708\beta + 1.18\gamma - 7.56$ and $5 < \gamma < 22$ (atomic %), which is a phase-change material outside the scope of the present invention.

This optical disc was evaluated after initialization in the same way. It was found that limit velocity for crystallization was fast, recording properties were not sufficient, and besides the reduction of reflectance after 200 hours left at 80° C. and 85% RH was 7% or more, and also found that the archival property deteriorated. The results are shown in Table 1.

TABLE 1

| Example and Comparative Example | Phase-change Material | Recording Properties | | | | Storage Reliability | |
|---|---|---|---|---|---|---|---|
| | | 6X | 8X | 10X | 12X | Reduction of Reflectance $|\Delta|$ | Archival Property |
| Example 1 | $Ga_{11}Sb_{83}Sn_6$ | A | A | A | B | 4.5% | B |
| Example 2 | $Ga_{14}Sb_{58}Sn_{28}$ | A | A | A | B | 2.9% | — |
| Example 3 | $Ga_{12}Sb_{83}Sn_5$ | A | A | B | B | 1.9% | B |
| Example 4 | $Ga_{10}Sb_{89}Sn_1$ | B | A | A | B | 0.6% | B |
| Example 5 | $Ga_{11}Sb_{86}Sn_3$ | A | A | A | B | 0.7% | B |
| Example 6 | $Ga_{11}Sb_{84}Sn_5$ | A | A | A | B | 0.9% | B |
| Example 7 | $Ga_{11}Sb_{59}Sn_{22}Ge_8$ | A | A | A | B | 0.5% | A |
| Example 8 | $Ga_{11}Sb_{59}Sn_{22}Ge_6In_2$ | A | A | A | A | 3.9% | B |
| Example 9 | $Ga_{11}Sb_{59}Sn_{22}Ge_6Bi_2$ | A | A | A | A | 3.7% | B |
| Example 10 | $Ga_{11}Sb_{59}Sn_{22}Ge_6Se_2$ | A | A | A | A | 3.5% | B |
| Example 11 | $Ga_{11}Sb_{59}Sn_{22}Ge_6Zn_2$ | A | A | A | B | 0.3% | A |
| Example 12 | $Ga_{11}Sb_{59}Sn_{22}Ge_6Mn_2$ | A | A | A | B | 0.2% | A |
| Example 13 | $Ga_{11}Sb_{59}Sn_{22}Ge_6Ag_2$ | A | A | A | B | 0.4% | A |
| Comparative Example 1 | $Ga_{13}Sb_{71}Sn_{16}$ | A | A | B | B | 7.3% | C |
| Comparative Example 2 | $Ga_8Sb_{75}Sn_{17}$ | C | C | C | C | 7.1% | C |

What is claimed is:

1. An optical recording medium comprising:
   a substrate having translucency;
   a first protective layer thereon;
   a recording layer composed of a phase-change material;
   a second protective layer;
   a third protective layer; and
   a reflective layer,
   wherein laser beam irradiation causes phase-change of the recording layer between a crystalline phase and an amorphous phase thereby at least one of to rewrite and to record information,
   wherein the phase-change material comprises Ga, Sb and Sn, Ga content, Sb content, and Sn content satisfy the following formula, and the total content of Ga, Sb and Sn is at least 92 atomic % of the entire phase-change material:

$Ga_\alpha Sb_\beta Sn_\gamma$ (where, $\alpha+\beta+\gamma=100$ atomic %), where $20 \leq -2.75\alpha + 0.708\beta + 1.18\gamma - 7.56 \leq 43$, and $\alpha/(\alpha+\beta) \leq 0.12$, and wherein the first protective layer has a film thickness of 40 nm to 200 nm, the recording layer has a film thickness of 6 nm to 20 nm, the second protective layer has a film thickness of 4 nm to 20 nm, the third protective layer has a film thickness of 2 nm to 10 nm, and the reflective layer has a film thickness of 100 nm to 300 nm.

2. The optical recording medium according to claim 1, wherein the phase-change material further comprises 1 atomic % to 20 atomic % of Ge.

3. The optical recording medium according to claim 1, wherein the phase-change material further comprises 1 atomic % to 10 atomic % of at least one additive element selected from the group consisting of In, Al, Zn, Mg, Tl, Pb, Bi, Cd, Hg, Se, C, N, Au, Ag, Cu, Mn, and Dy.

4. The optical recording medium according to claim 1, wherein at least one of the first protective layer and the second protective layer comprises a mixture of ZnS and $SiO_2$.

5. The optical recording medium according to claim 1, wherein the reflective layer comprises one of pure Ag and an alloy containing Ag as a main constituent.

6. The optical recording medium according to claim 5, wherein the third protective layer is between the second protective layer and the reflective layer, and wherein the third protective layer comprises one of Si and SiC as a main constituent.

7. The optical recording medium according to claim 1, wherein the substrate has a meandering groove with a groove pitch of 0.74±0.03 nm, a groove depth of 22 nm 40 nm, and a groove width of 0.2 μm to 0.4 μm, wherein a recording of the optical recording medium at a recording linear velocity of 6× speed to 12× speed of DVD (about 20 m/s to 43 m/s) is possible.

8. An optical recording medium comprising:
   a substrate having translucency;
   a first protective layer thereon;
   a recording layer composed of a phase-change material;
   a second protective layer;
   a third protective layer; and
   a reflective layer,
   wherein laser beam irradiation causes phase-change of the recording layer between a crystalline phase and an amorphous phase thereby at least one of to rewrite and to record information,
   wherein the phase-change material comprises Ga, Sb and Sn, Ga content, Sb content, and Sn content satisfy the following formula, and the total content of Ga, Sb and Sn is at least 92 atomic % of the entire phase-change material:

$Ga_\alpha Sb_\beta Sn_\gamma$ (where, $\alpha+\beta+\gamma=100$ atomic %), where $20 \leq -2.75\alpha + 0.708\beta + 1.18\gamma - 7.56 \leq 43$, and $\gamma \leq 5$, or $\gamma \geq 22$, and wherein the first protective layer has a film thickness of 40 nm to 200 nm, the recording layer has a film thickness of 6 nm to 20 nm, the second protective layer has a film thickness of 4 nm to 20 nm, the third protective layer has a film thickness of 2 nm to 10 nm, and the reflective layer has a film thickness of 100 nm to 300 nm.

9. The optical recording medium according to claim 8, wherein $\alpha$ and $\beta$ of the composition formula satisfy the following formula:

$0.12 < \alpha/(\alpha+\beta) < 0.14$.

10. The optical recording medium according to claim 8, wherein $\alpha$ and $\beta$ of the composition formula satisfy the following formula:

$$\alpha/(\alpha+\beta) \leqq 0.12.$$

11. The optical recording medium according to claim 8, wherein the phase-change material further comprises 1 atomic % to 20 atomic % of Ge.

12. The optical recording medium according to claim 8, wherein the phase-change material further comprises 1 atomic % to 10 atomic % of at least one additive element selected from the group consisting of In, Al, Zn, Mg, Tl, Pb, Bi, Cd, Hg, Se, C, N, Au, Ag, Cu, Mn, and Dy.

13. The optical recording medium according to claim 8 wherein at least one of the first protective layer and the second protective layer comprises a mixture of ZnS and $SiO_2$.

14. The optical recording medium according to claim 8, wherein the reflective layer comprises one of pure Ag and an alloy containing Ag as a main constituent.

15. The optical recording medium according to claim 14, wherein the third protective layer is between the second protective layer and the reflective layer, and wherein the third protective layer comprises one of Si and SiC as a main constituent.

16. The optical recording medium according to claim 8, wherein the substrate has a meandering groove with a groove pitch of 0.74±0.03 μm, a groove depth of 22 nm 40 nm, and a groove width of 0.2 μm to 0.4 μm, wherein a recording of the optical recording medium at a recording linear velocity of 6× speed to 12× speed of DVD (about 20 m/s to 43 m/s) is possible.

* * * * *

UNITED STATES PATENT AND TRADEMARK OFFICE
CERTIFICATE OF CORRECTION

PATENT NO. : 7,485,357 B2
APPLICATION NO. : 11/441284
DATED : February 3, 2009
INVENTOR(S) : Mikiko Takada et al.

It is certified that error appears in the above-identified patent and that said Letters Patent is hereby corrected as shown below:

Cover page, column 1, after
"(*) Notice:   Subject to any disclaimer, the term of this patent is extended or adjusted under 35 U.S.C. 154(b) by 49 days."
insert --This patent is subject to terminal disclaimers.-- column 2, item (45), before "Feb. 3, 2009" insert --(*)--

Signed and Sealed this

Eleventh Day of August, 2009

David J. Kappos
*Director of the United States Patent and Trademark Office*